April 17, 1962   E. J. ESSWEIN, JR., ET AL   3,030,229
SANITARY CAN COATING COMPOSITIONS
Filed March 2, 1960
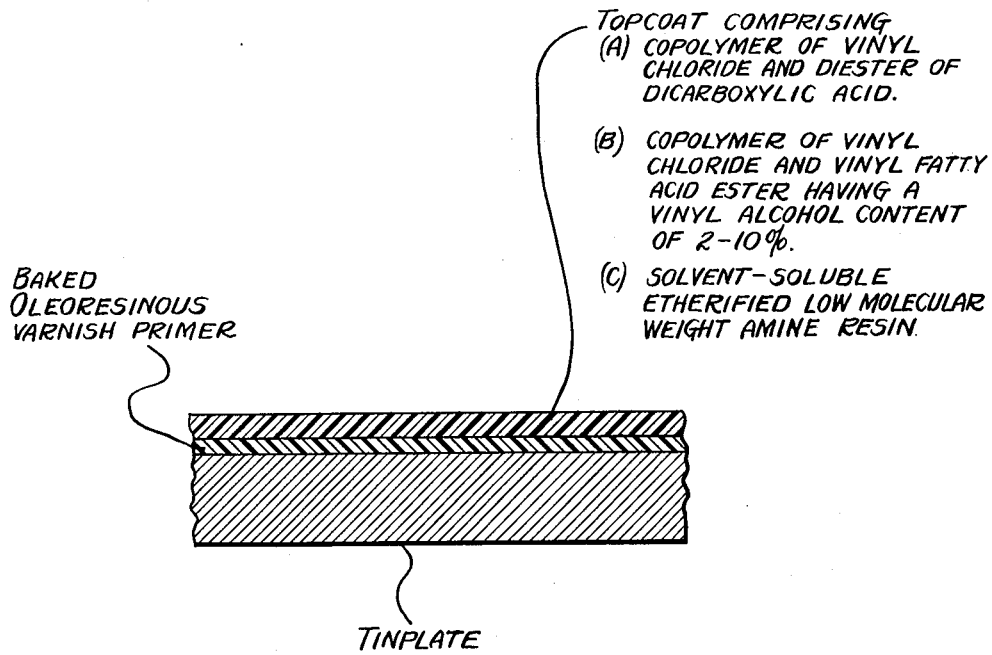
INVENTORS
EDWARD J. ESSWEIN, JR.
NAAMAN F. BARR
BY
ATTORNEYS 3,030,229
SANITARY CAN COATING COMPOSITIONS
Edward J. Esswein, Jr., Shaler Township, Allegheny County, and Naaman F. Barr, Pine Township, Allegheny County, Pa., assignors, by mesne assignments, to Martin-Marietta Corporation, Chicago, Ill., a corporation of Maryland
Filed Mar. 2, 1960, Ser. No. 12,292
19 Claims. (Cl. 117—75)

The present invention relates to sanitary can coating compositions and particularly to coatings for the interior of beer cans which can be applied from essentially aromatic hydrocarbon solvent solutions of high resin solids content to provide adherent coatings resistant to elevated temperature pasteurizing treatments and which resist crazing or microfracturing when the coated products are extensively fabricated as in the formation of can ends.

In accordance with the invention certain aromatic hydrocarbon-soluble copolymers of 55–75% of vinyl halide, typically vinyl chloride, with the balance of the copolymer consisting essentially of di-saturated hydrocarbon ester of acid from the group of maleic, fumaric and chloromaleic acids and mixtures thereof, said esters containing 6–24 carbon atoms, are blended with: (1) a minor proportion of a copolymer of vinyl chloride and vinyl fatty acid ester containing from 60–92% and preferably from 80–92% by weight of vinyl chloride and having a vinyl alcohol content of from 2–10% by weight; and (2) a small proportion of a solvent-soluble etherified low molecular weight amine resin, such as butylated trimethylol melamine.

The two modifying components set forth above are both essential to the invention and these provide improved adhesion, particularly wet adhesion, especially when the coatings are applied over a baked oleoresinous varnish primer and improved resistance to crazing or microfracturing upon extensive fabrication as in the formation of can ends. Resistance of the coatings to blush upon exposure to water at elevated temperature is also somewhat improved.

The new article which may be produced in accordance with the present invention is illustrated in cross-section in the single figure of the accompanying drawing.

More particularly in accordance with the invention, the aromatic hydrocarbon-soluble copolymers are blended together with the vinyl alcohol-containing copolymers in a weight ratio of from 98/2 to 75/25, and more preferably in a weight ratio of 96/4 to 80/20 and from 2–10%, preferably from 2–4% of etherified amine resin based on the combined weight of the aromatic hydrocarbon-soluble copolymers and vinyl alcohol-containing copolymers, and these three resinous components are dissolved in a solvent medium containing at least 75% and preferably at least 90% by weight of liquid mononuclear aromatic hydrocarbon solvent, preferably toluene, to provide a concentrated solvent solution containing at least 18% resin solids and more preferably from 20–35% resin solids. These solutions, when deposited upon sheet metal stock and more particularly upon primed or unprimed tinplate and baked, provide films which adhere well and which also possess reasonably satisfactory resistance to blush under pasteurization conditions and substantially improved tolerance for fabrication without crazing.

The aromatic hydrocarbon-soluble copolymers of 55–75% of vinyl chloride with the balance of the copolymer consisting essentially of di-saturated hydrocarbon ester of acid from the group of maleic, fumaric and chloromaleic acids and mixtures thereof, said esters containing 6–24 carbon atoms, which are employed in the invention are characterized by complete solubility in toluene at 25% solids and by a relatively viscosity measured at 20° C. in 1% cyclohexanone of from 1.3–1.7. To facilitate providing the desired low molecular weight, the monomers constituting the copolymer may be polymerized in the presence of from about 1 to about 6.5% of a saturated halogenated hydrocarbon or an ethylenically unsaturated halogenated hydrocarbon which is not readily copolymerized with vinyl chloride, but this is not essential. A particularly preferred copolymer falling within this class is a copolymer prepared by aqueous emulsion polymerization in the presence of 1% by weight, based on the total weight of monomers, of ammonium presulfate and containing 70 parts of vinyl chloride copolymerized with about 30 parts of a commercial mixture of substantially equal parts of n-dibutyl maleate and n-dibutyl fumarate. This copolymer has a relative viscosity measured at 20° C. in cyclohexanone of 1.45 and is referred to hereinafter as copolymer "A."

Copolymers of the type exemplified by copolymer A are not well adapted for sanitary can coatings because they do not adhere well to electrolytic tinplate (whether primed or unprimed) and coatings of these copolymers possess only marginal resistance to blush when subjected to pasteurization conditions (exposure to water for 45 minutes at 170° F.). The lack of adhesion is particularly evidenced when the copolymers exemplified by copolymer A are applied over baked oleoresinous phenol-aldehyde primers. Of particular importance is the inability of these copolymers to tolerate extensive fabrication without crazing or microfracturing.

The maleic and fumaric dihydrocarbon esters employed as components of the copolymers typified by copolymer A are esters, within the cited classes, in which the radicals esterified by the maleic or fumaric acid are hydrocarbon radicals which contain from 1 to 10 carbon atoms and are saturated, i.e., free from ethylenic unsaturation although they may contain aromatic groups. On this basis, the diesters will contain from 6 to 24 carbon atoms. Suitable hydrocarbon groups include methyl groups, ethyl groups, normal- and iso-propyl groups, normal-, secondary and tertiary butyl groups, the several amyl groups, n-hexyl groups, cyclohexyl groups, 2-ethyl hexyl groups, phenyl groups, benzyl groups, naphthyl groups, and the like. Specific exemplary diesters include dimethyl maleate, dimethyl fumarate, diethyl maleate, di-n-butyl maleate, di-n-butyl fumarate, di-n-propyl maleate, diisopropyl maleate, diisobutyl maleate or fumarate, di-secondary butyl maleate, di(2-ethyl hexyl) maleate, di(cyclohexyl) maleate, and di-benzyl maleate.

The esters used need not be pure compounds; thus mixtures of suitable dialkyl maleates and/or fumarates may be used in lieu of pure esters of these respective types. A particularly useful combination of specific dihydrocarbon esters has been found to be the combination of a commercial material offered as di-n-butyl maleate but actually containing approximately equal proportions of di-n-butyl maleate and di-n-butyl fumarate.

As set forth hereinabove, there may be employed in the production of copolymers typified by copolymer A any saturated halogenated hydrocarbons, preferably those containing from 1 to 4 carbon atoms, examples of these being the halogenated methanes such as carbon tetrachloride, carbon tetrabromide, bromochlorodifluoromethane, bromoform, methyl chloride, methyl bromide, methyl iodide, chloroform, iodoform, methylene dichloride, methylene dibromide and the like, halogenated ethanes such as ethyl chloride, 1,1,2-trichloroethane, 1,1,2,2-tetrachloroethane, ethylene chloride, ethylene bromide, ethyl bromide, ethyl iodide, 1,1,2-trichloro-2-fluoroethane, 1,1,2-tribromoethane, 1,1-dichloro-2-bromoethane, pentachloroethane and the like, and halogenated propanes and butanes such as n-propyl chloride, n-propyl iodide, isopropyl chloride, isopropyl bromide, n-butyl chloride, 1,4-dichlorobutane, t-butyl chloride, and the like. Suitable halogenated hydrocarbons containing more than 4 carbon atoms include for instance amyl chloride, dodecyl bromide, dodecyl iodide, the dichloropentanes, hexadecyl chloride and the like. If it is desired to remove these materials at the close of the reaction, resort may be had to vacuum drying, steam distillation or methanol extraction. It will be understood that, instead of the pure halogenated hydrocarbons, mixtures containing two or more of the suitable compounds may be used.

Also, there may be employed in the production of copolymers typified by copolymer A any halogenated ethylenically unsaturated hydrocarbon which is not readily copolymerizable with vinyl chloride. Vinyl chloride itself, vinyl bromide, vinyl fluoride, vinyl iodide, vinylidene chloride, vinylidene bromide, vinylidene iodide, vinylidene chlorobromide, vinylidene chloroiodide, vinylidene bromoiodide, vinylidene fluoroiodide, vinylidene fluorobromide, vinylidene fluorochloride, and trichloroethylene are thus to be excluded from the suitable unsaturated halohydrocarbons on this basis. Suitable unsaturated halogenated hydrocarbons other than those listed above as unsuitable will be seen to include for instance cis- and trans-1,2-dichloroethylene, cis- and trans-1,2-dibromoethylene, tetrachloroethylene, tetrabromoethylene, 1,1-dichloro-2-bromoethylene, allyl chloride, methallyl chloride, allyl bromide, allyl iodide, methallyl bromide, methallyl iodide, 2,3-dichloro-1-propane, 3,3-dichloro-1-propane, 2,3-dibromo-1-propane, 1-chloro-2-butene, 1-chloro-2-decene, 1-chloro-2-octadecene, and the like. In general, it will be preferred to employ those unsaturated halogenated compounds containing from 1 to 4 carbon atoms, although higher molecular weight compounds may also be used. It will be understood that, instead of a single pure unsaturated halogenated hydrocarbon, there may be employed any mixture of such compounds which are individually suitable. If desired or necessary to remove the unsaturated halogenated compound at the completion of the polymerization, this can be done by means of vacuum drying, solvent extraction or the like.

The vinyl alcohol-containing copolymers which are useful in accordance with the invention are copolymers of vinyl chloride and vinyl fatty acid ester which have been hydrolyzed or saponified to convert a portion of the vinyl ester component to vinyl alcohol. As is known, the conversion to vinyl alcohol can be achieved either by acid hydrolysis or alkaline saponification. These vinyl alcohol-containing copolymers may be essentially saturated materials possessing only a small iodine number of 1 or 2, or they may be unsaturated and have corrected iodine numbers of from 2 to 10. Thus, the various partially hydrolyzed or saponified vinyl chloride/vinyl fatty acid ester copolymers disclosed in Penn and Suter United States Patent 2,512,726 may be used but it is preferred, in accordance with the invention, to employ copolymers which have been saponified while suspended in alkaline alcoholic medium. The iodine number referred to is determined by the Wijs method and is reported in grams of absorbed iodine per 100 grams of resin. The term "corrected" designates subtraction of the iodine number of the resin prior to saponification.

The copolymers of vinyl chloride and vinyl esters which are modified to include vinyl alcohol should have a molecular weight in the range of about 5,000–20,000, but the lower molecular weight copolymers (below about 12,000, preferably below 9,000) are preferred since these are more soluble in the essentially aromatic hydrocarbon solvent medium.

The preferred copolymers of vinyl chloride and vinyl fatty acid ester, preferably vinyl acetate, which are employed in accordance with the present invention contain from about 80–92% by weight of vinyl chloride component. These copolymers are desirably saponified while in suspension in alkaline alcoholic medium in order to convert a portion of the vinyl ester to vinyl alcohol to produce at least about 2% and preferably at least 3% by weight of vinyl alcohol and to dehydrohalogenate the copolymer to produce an average unsaturation of at least about 1.0 double bond per copolymer molecule. Preferred partially saponified copolymers have a corrected iodine number from 2 to 10. The conversion of vinyl acetate or other fatty acid ester in the copolymer molecule to vinyl alcohol should not exceed 85% and is preferably less than 78%, particularly where the copolymer is of low molecular weight.

Preferably, saponification of the vinyl chloride-vinyl ester copolymers is effected by saponifying the copolymer in solid, finely divided form suspended in alcohol medium with a limited concentration of a strongly basic material so that a limited vinyl alcohol content can be accompanied by substantial unsaturation in the substantial absence of degradation which is evidenced by thermal instability. The saponified copolymer preferably is washed with alcohol and water to a salt content of less than 1% by weight. The predominant unsaturation in the copolymer is polyene unsaturation which is not necessarily conjugated and preferred copolymers contain at least 3 double bonds per copolymer molecule in a major proportion of the copolymer molecules which are present.

In accordance with preferred practice of the present invention, a copolymer of vinyl chloride, with a vinyl fatty ester, preferably vinyl acetate, is saponified in the form of a slurry of the solid, finely divided copolymer in a substantially anhydrous liquid medium containing a lower aliphatic alcohol, for example, methanol, and saponification is effected employing a strongly basic material selected from the group consisting of alkali metal hydroxides, alkali metal alcoholates and quaternary ammonium hydroxides. The strongly basic material is normally employed in small concentration and stoichiometric quantities of strongly basic material are used based on the desired conversion to vinyl alcohol and removal of hydrogen chloride.

The preferred procedure is to heat the slurry at a temperature ranging from about 60° C. to about 80° C. to convert the desired proportion of vinyl acetate to vinyl alcohol and to produce the desired unsaturation.

The alkaline saponified copolymers which are preferably employed are described at length in the copending application of Xavier V. Laporta, filed October 24, 1957, Serial No. 692,033, the disclosure of which is hereby incorporated. In the said Laporta application, it is indicated that the saponification reaction normally requires a reaction period of at least one quarter hour, that the copolymer is dispersed in the alcoholic medium in the form of fine particles to produce slurries containing from 15% to 60% by weight of solid material based on the weight of the liquid organic medium and that the concentration of strongly basic material be between 0.018 and 0.18 mol pound of alkaline hydroxide per 100 pounds of slurried saponifiable resin. It is further indicated that the saponified product is thoroughly washed, preferably by successive alcohol and water washes, to reduce the salt concentration to less than 1% by weight.

A preferred alkaline suspension saponified copolymer of vinyl chloride and vinyl acetate for use in accordance with the present invention is produced in the following manner:

12 pounds of "Vinylite VYLF" (a copolymer of vinyl chloride with vinyl acetate in a weight ratio of 87:13 having an intrinsic viscosity at 20° C. in 1.0% solution in cyclohexanone of 0.24, a specific gravity of 1.34 and a particle size range of 150–250 microns) were slurried in 24 pounds of anhydrous methanol in the presence of 0.43 pound of C.P. potassium hydroxide and heated with stirring at 63° C. for 3 hours. The supernatant liquid was then removed and the saponified resin particles were washed successively with methanol and then with cold water. Each wash had twice the volume of the supernatant liquid which was removed. The final resin had a vinyl alcohol content of 5.0% and contained substantial unsaturation (corrected iodine number of about 3).

The above described saponified copolymer will be referred to hereinafter as copolymer "B."

The etherified low molecular weight amino resin which is employed in accordance with the invention is prepared by etherifying the polymethylol condensation product of a polyamine selected from the group consisting of urea, melamine and benzoguanamine with a molar excess of formaldehyde and with an excess of a primary saturated monohydric alcohol containing from 3 to 8 carbon atoms in the presence of an acid catalyst, whereby the plurality of free methylol groups produced by said condensation are etherified by said alcohol to provide a solution of said condensation product in the alcohol medium provided by the excess alcohol.

A preferred amino resin is butylated trimethylol melamine resin and may be prepared as follows:

250 parts of 37% aqueous formaldehyde (3 mols) are charged into a kettle and the pH adjusted to pH 8 with ammonium hydroxide. 126 parts of melamine (1 mol) were then added and the mixture heated to 80° C. with agitation until all of the melamine had been dissolved. The resulting syrup was poured into trays for cooling and the product solidified after 5 hours. The solidified product was then crushed and dried at 50° C. for 10 hours to a moisture content of 2–3% and the dry product was then ground to provide trimethylol melamine in the form of a fine powder.

The dry powder trimethylol melamine was then heated to liquefy the same and 222 parts of n-butanol (3 mols) were added, followed by enough phosphoric acid to bring the pH to pH 5.5 and the mixture was boiled for 30 minutes. The reaction mixture was then concentrated under vacuum at 60–70° C. at a pressure of 100–200 mm. Hg and at a pH of 5.5–6.5, the distillate being an azeotropic mixture of butanol and water. The dehydrated resin was idluted with butanol and xylene to provide a 50% resin solids solution in solvent consisting of xylene and butanol in a weight ratio of 20:80. This etherified low molecular weight amine resin will be referred to hereinafter as amine resin "A."

In accordance with the invention, coating is effected from a solvent solution in which the solvent is largely or preferably entirely constituted by liquid aromatic hydrocarbon solvent. Preferred aromatic solvents are mononuclear, such as benzene, toluene, xylene, ethylbenzene, and isomers and homologs thereof, these being useful either alone or in admixture with one another. Condensed aromatic solvent such as methyl naphthalene may also be employed either alone or in admixture with mononuclear aromatic hydrocarbons. Toluene is preferred.

While it is preferred to employ a solvent medium consisting of liquid aromatic hydrocarbon solvent, the invention includes the presence of small proportions not exceeding 25% and preferably not exceeding 10% by weight based on the total weight of solvent, of more active solvents for vinyl resins.

Thus, minor amounts of an active polar solvent may be included in the solvent medium for the purpose of increasing the proportion of resin solids which may be dissolved or to decrease the viscosity of a solvent solution of given resin solids content. Among the active polar solvents which may be used are various oxygen containing solvents, for example, ketones such as acetone, methyl ethyl ketone, methyl isobutyl ketone, cyclohexanone, ethyl butyl ketone, isophorone and diacetone alcohol; esters, such as ethyl acetate, n-butyl acetate, isobutyl acetate and butyl propionate; cyclic oxygen compounds, such as tetrahydrofuran, tetrahydropyran, dioxane and propylene carbonate; ether alcohols and esters thereof, such as Cellosolve and Cellosolve acetate; nitrated organic compounds, such as 2-nitropropane and nitrobenzene; amides, such as dimethyl formamide; and nitriles, such as acetonitrile.

The employment of active ketone and ester solvents such as those above referred to is not a necessary requirement for effectuating complete solution of the copolymer blends of the invention which may be dissolved in substantial proportion in mononuclear aromatic hydrocarbon solvent alone. However, the need for minor amounts of active polar solvent increases with the use of increasing proportions of copolymers typified by copolymer B, as well as with the formulation of solvent solutions of increasing resin solids content.

The coating compositions of the invention may be used on various metal surfaces but are preferably applied to tinplate which is desirably surfaced with a baked primer coating. The primer may be oil-soluble resinous varnish materials, or epoxy resin compositions (70 parts Epon 1007) modified with ureaformaldehyde resin (25 parts) and alkaline-condensed phenolformaldehyde resin (5 parts) or hydrocarbon primers prepared by copolymerizing 100 to 50 parts of butadiene-1,3 with 0 to 50 parts of styrene, desirably in the presence of finely divided metallic sodium in hydrocarbon diluent. Particularly suitable copolymers are those containing from 75 to 85 parts of butadiene copolymerized with 50 to 25 parts of styrene and these may be applied to the base either alone or in the presence of 5–40% of a reactive monomer such as styrene or vinyl toluene. Hydrocarbon primers of the type referred to are more fully disclosed in United States Patents 2,903,440, 2,908,585 and 2,586,594. Oil-soluble, heat-bodied, unsaturated, non-heat hardening, oil-modified resinous varnishes are preferred by reason of economy and availability.

Generally preferred primers are oleoresinous phenolaldehyde varnishes which are normally prepared by heating phenol-aldehyde resin in a kettle with the unsaturated drying oil to dissolve the mixture and to body the mixture to the desired consistency after which it is thinned with solvent.

The drying oil constituent may include unsaturated drying oils such as fast drying oils having two or more conjugated double bonds per acid radical in the molecule, for example, China-wood oil, oiticica oil and dehydrated castor oil; medium drying oils having three or more non-conjugated double bonds per acid radical in the molecule, such as perilla oil, linseed oil, soya bean oil and the glycerides of the clupanodonic acid of fish oils; and semi-drying oils having two non-conjugated double bonds in an acid radical thereof such as poppyseed, rapeseed and sunflower seed oils.

When employing semi-drying oils, it is necessary to employ higher temperatures for heat-bodying, such as temperatures in the range of 400° F.–500° F. The mixture being heat-bodied is blanketed with an inert gas and the heat-bodying takes about 2 hours. The mixture must be carefully watched so that the cooking is stopped when the desired viscosity is reached.

Preferred phenolic varnish primers contain from 6 to 18, preferably from 12 to 15 gallons of oil per 100 pounds of resin.

Any oil-soluble, non-heat hardening phenol-aldehyde resin may be employed. By a non-heat hardening resin is meant phenol-aldehyde condensates which avoid substantial further condensation of the resin with itself during cooking with the oil.

Preferred phenol-aldehyde resins falling within the class specified are produced by reacting an aldehyde, preferably formaldehyde, with monohydric phenols, such as para tertiary butyl phenol in a mol ratio of aldehyde to phenol in the range of from 0.75/1 to 1/1 in aqueous solution medium in the presence of an acid catalyst such as phosphoric acid in an amount of 1% based on the weight of the phenol. Various oil-soluble, non-heat hardening phenol-aldehyde resins, including condensation products produced using a somewhat higher mol ratio of aldehyde to phenol and alkaline catalysis, are known to the art and these are also usable in accordance with the invention.

The phenolic constituent of the phenol-aldehyde resin may be phenol itself or it may be phenol substituted in the ortho and/or para position with an alkyl or aryl or aralkyl substituent. Thus, there may be used ortho or para cresol or mixed xylenols. The preferred phenolic constituent is illustrated by ortho or para cresol, para phenyl phenol or para tertiary butyl phenol. Para tertiary amyl phenol and para cyclohexyl phenol are also particularly desirable as the phenol constituent.

A preferred oleoresinous phenol-aldehyde varnish primer may be made as follows:

20 parts of oil-soluble para tertiary butyl phenol/formaldehyde resin and 20 parts of tung oil are mixed in an open varnish kettle and heated to 325° F. in about 15 minutes. The temperature is then raised to 380° F. and held for approximately 1.5 hours. The oleoresinous primer so produced is thinned with 60 parts of xylene and may be coated upon blackplate or tinplate and cured by baking for 10 minutes at 400° F.

A drier, such as lead, cobalt, calcium, or manganese, resinate and/or naphthenate, etc., may be introduced into the oleoresinous varnish before the coating operation, to exercise its effect during the baking. One-twentieth percent of cobalt as cobalt naphthenate may, for example, be added to the oleoresinous varnish based on the weight of the oil, to accelerate the curing of the oleoresinous component.

The oil-soluble para tertiary butyl phenol/formaldehyde resin referred to above was produced by condensing 1 mol of para tertiary butyl phenol with 0.9 mol of formaldehyde in water solution containing 1% by weight, based on the weight of the phenol, of 85% by weight aqueous phosphoric acid. The solution was maintained at reflux temperature for one hour to insure completion of the reaction. Water was then removed by vacuum distillation to provide a hard and friable resin.

A particularly valuable commercial oleoresinous primer of the non-phenolic type, but still falling within the category of oil-soluble, non-heat hardening resinous varnishes, which are heat bodied with an unsaturated drying oil comprises rosin which has been heat reacted with a small proportion of an alpha, beta-ethylenically unsaturated acid or anhydride such as maleic acid, maleic anhydride, citraconic acid or anhydride, itaconic acid or anhydride, etc., and with a polyhydric aliphatic alcohol, particularly glycerol. The modified rosin reaction product so produced is heat-bodied with the same type of unsaturated drying oils as have been previously referred to with respect to the phenolic primers.

The invention is illustrated in the examples which follow:

Example I 90 parts by weight of copolymer A, 10 parts by weight of copolymer B and 2 parts by weight of amine Resin A provided in a 50% resin solids solution in xylene/butanol (weight ratio 20/80) were dissolved in a 95/5 mixture of toluene and methyl ethyl ketone to provide a solution containing 22% of resin solids and this solution was applied to electrolytic tin plate and baked for 6 minutes at 300° F. to provide a baked film weighing 5 mg./sq. in., and also upon commercially primed electrolytic tin plate. The coated product possessed excellent dry adhesion and satisfactory resistance to blush upon being subjected to water in both liquid and vapor forms for 45 minutes at 170° F. The coated plate was satisfactorily fabricated to produce can bodies as well as can ends. Significantly, there was substantially no crazing despite the substantial deformation of the coated plate involved in the production of the can ends.

Example II

By substituting for copolymer A in Example I a corresponding weight of three modifications of copolymer A produced by conducting the emulsion polymerization in the presence of 2% by weight based on monomers of the chain terminating agents: (1) trichloroethylene, (2) 1,2-dichloroethylene and (3) tetrachloroethane, substantially identical results are obtained.

Example III

Copolymer A in Example I was replaced by a corresponding weight of a similar copolymer produced using solution copolymerization in acetone in the presence of 1% of benzoyl peroxide based on total monomers and using diisobutyl fumarate in place of the commercial mixture of diesters used to produce copolymer A. Substantially identical results were obtained.

Example IV

Example I was repeated replacing copolymer B with an equal weight of a copolymer of 87 parts of vinyl chloride and 13 parts of vinyl acetate having a molecular weight of about 18,000 and hydrolyzed to a vinyl alcohol content of 6% by weight. This copolymer was essentially saturated. The mixture of copolymers was dissolved in a mixture of toluene and methyl ethyl ketone having a weight ratio of 85/15. Satisfactory solution and film properties were obtained.

The invention is defined in the claims which follow:

We claim:

1. Coating compositions adapted for application to the interior of sanitary cans to provide adherent coatings resistant to elevated temperature pasteurizing treatments comprising a solvent medium comprising at least 75% by weight of liquid mononuclear aromatic hydrocarbon solvent and having dissolved therein at least 18% by weight of resin solids constituted by a mixture of copolymer components A and B in a weight ratio of from 98/2 to 75/25 together with from 2–10% based on the combined weight of copolymer components A and B of etherified amine resin, said copolymer component A being aromatic hydrocarbon-soluble copolymer of 55–75% of vinyl chloride with the balance of the copolymer consisting essentially of di-saturated hydrocarbon ester of acid selected from the group consisting of maleic, fumaric and chloromaleic acids and mixtures thereof, said di-esters containing 6–24 carbon atoms and said copolymer component A being characterized by complete solubility in toluene at 25% solids and by a relative viscosity measured at 20° C. in 1% cyclohexanone of from 1.3–1.7, said copolymer component B being a copolymer of from 60–92% by weight of vinyl chloride with vinyl fatty acid ester and having a vinyl alcohol content of from 2–10% by weight, and said etherified amine resin is a solvent-soluble ether of a primary saturated monohydric alcohol containing from 3 to 8 carbon atoms with the polymethylol condensation product of a polyamine selected from the group consisting of urea, melamine and benzo guanamine with a molar excess of formaldehyde.

2. Coating compositions as recited in claim 1 in which the weight ratio of copolymer components A and B is from 96/4 to 80/20.

3. Coating compositions as recited in claim 1 in which said etherified amine resin is present in an amount of from 2–4% based on the combined weight of copolymer components A and B.

4. Coating compositions as recited in claim 1 in which said mononuclear aromatic hydrocarbon solvent is toluene.

5. Coating compositions as recited in claim 4 in which said toluene is present in said solvent medium in an amount of at least 90%.

6. Coating compositions as recited in claim 5 in which said solvent medium contains from 20–35% by weight of resin solids dissolved therein.

7. Coating compositions as recited in claim 1 in which said copolymer component B has a corrected iodine number of from 2-10 and a molecular weight in the range of from 5,000-20,000.

8. Coating compositions as recited in claim 7 in which said copolymer component B contains from 80-92% by weight of vinyl chloride and has a molecular weight of less than 12,000.

9. Coating compositions as recited in claim 7 in which said copolymer component B is a copolymer of vinyl chloride and vinyl acetate saponified in the form of a slurry of finely divided solid copolymer suspended in a substantially anhydrous alcoholic medium containing a strongly basic saponifying agent.

10. Coating compositions as recited in claim 1 in which said etherified amine resin is a solvent-soluble ether of a polymethylol condensation product of melamine and formaldehyde.

11. Coating compositions as recited in claim 1 in which said solvent medium includes up to 25% of active polar solvent selected from the group consisting of acetone, methyl ethyl ketone, methyl isobutyl ketone, cyclohexanone, ethyl butyl ketone, isophorone, diacetone alcohol, ethyl acetate, n-butyl acetate, isobutyl acetate, butyl propionate, tetrahydrofuran, tetrahydropyran, dioxane, propylene carbonate, Cellosolve, Cellosolve acetate, 2-nitropropane, nitrobenzene, dimethyl formamide and acetonitrile.

12. Coating compositions as recited in claim 1 in which said di-ester component of said copolymer A is a dibutyl ester.

13. Tinplate surfaced with a baked film of the coating compositions recited in claim 1.

14. Tinplate surfaced with a baked oleoresinous phenol-aldehyde varnish primer and overcoated with a baked film of the coating compositions recited in claim 1.

15. A product as recited in claim 14 in which said oleoresinous phenol-aldehyde varnish is constituted by an oil-soluble, non-heat hardening phenol-aldehyde resin heat-bodied with from 6 to 18 gallons of drying oil per 100 pounds of said phenol-aldehyde resin.

16. Coating compositions adapted for application to the interior of sanitary cans to provide adherent coatings resistant to elevated temperature pasteurizing treatments comprising a solvent medium comprising at least 75% by weight of liquid mononuclear aromatic hydrocarbon solvent and having dissolved therein at least 18% by weight of resin solids constituted by a mixture of copolymer components A and B in a weight ratio of from 98/2 to 75/25 together with from 2-10% based on the combined weight of copolymer components A and B of etherified amine resin, said copolymer component A being aromatic hydrocarbon-soluble copolymer of 55-75% of vinyl chloride with the balance of the copolymer consisting essentially of di-saturated hydrocarbon ester of acid selected from the group consisting of maleic, fumaric and chloromaleic acids and mixtures thereof, said di-esters containing 6-24 carbon atoms and said copolymer component A being characterized by complete solubility in toluene at 25% solids and by a relative viscosity measured at 20° C. in 1% cyclohexanone of from 1.3-1.7, said copolymer component B being a copolymer of from 60-92% by weight of vinyl chloride with vinyl fatty acid ester and having a vinyl alcohol content of from 2-10% by weight, and said etherified amine resin is a solvent-soluble ether of a primary saturated monohydric alcohol containing from 3 to 8 carbon atoms with the low molecular weight amine resin formed by condensing a polyamine with a molar excess of formaldehyde.

17. Coating compositions adapted for application to the interior of sanitary cans to provide adherent coatings resistant to elevated temperature pasteurizing treatments comprising liquid mononuclear aromatic hydrocarbon solvent as essential solvating medium and having dissolved therein at least 18% by weight of resin solids constituted by a mixture of copolymer components A and B in a weight ratio of from 98/2 to 75/25 together with from 2-10% based on the combined weight of copolymer components A and B of etherified amine resin, said copolymer component A being aromatic hydrocarbon-soluble copolymer of 55-75% of vinyl chloride with the balance of the copolymer consisting essentially of di-saturated hydrocarbon ester of acid selected from the group consisting of maleic, fumaric and chloromaleic acids and mixtures thereof, said di-esters containing 6-24 carbon atoms and said copolymer component A being characterized by complete solubility in toluene at 25% solids and by a relative viscosity measured at 20° C. in 1% cyclohexanone of from 1.3-1.7, said copolymer component B being a copolymer of from 60-92% by weight of vinyl chloride with vinyl fatty acid ester and having a vinyl alcohol content of from 2-10% by weight, and said etherified amine resin is a solvent-soluble ether of a primary saturated monohydric alcohol containing from 3 to 8 carbon atoms with the low molecular weight amine resin formed by condensing a polyamine with a molar excess of formaldehyde.

18. Coating compositions adapted for application to the interior of sanitary cans to provide adherent coatings resistant to elevated temperature pasteurizing treatments comprising liquid mononuclear aromatic hydrocarbon solvent as essential solvating medium and having dissolved therein at least 18% by weight of resin solids constituted by a mixture of copolymer components A and B in a weight ratio of from 98/2 to 75/25 together with from 2-10% based on the combined weight of copolymer components A and B of etherified amine resin, said copolymer component A being aromatic hydrocarbon-soluble vinyl chloride copolymer characterized by complete solubility in toluene at 25% solids, said copolymer component B being a copolymer of from 60-92% by weight of vinyl chloride with vinyl fatty acid ester and having a vinyl alcohol content of from 2-10% by weight, and said etherified amine resin is a solvent-soluble ether of a primary saturated monohydric alcohol containing from 3 to 8 carbon atoms with the low molecular weight amine resin formed by condensing a polyamine with a molar excess of formaldehyde.

19. Coating compositions as recited in claim 18 in which said solvent medium comprises at least 75% by weight of liquid mononuclear aromatic hydrocarbon solvent.

References Cited in the file of this patent

UNITED STATES PATENTS

| | | |
|---|---|---|
| 2,707,157 | Stanton et al. | Apr. 26, 1955 |
| 2,780,564 | Gray et al. | Feb. 5, 1957 |
| 2,913,430 | Roeser | Nov. 17, 1959 |
| 2,923,431 | Beers | Feb. 2, 1960 |
| 2,941,974 | Reymann et al. | June 21, 1960 |